Aug. 7, 1962
H. STEIRO
3,047,929
CONCRETE PIPE MAKING APPARATUS
Filed March 5, 1958
2 Sheets-Sheet 1
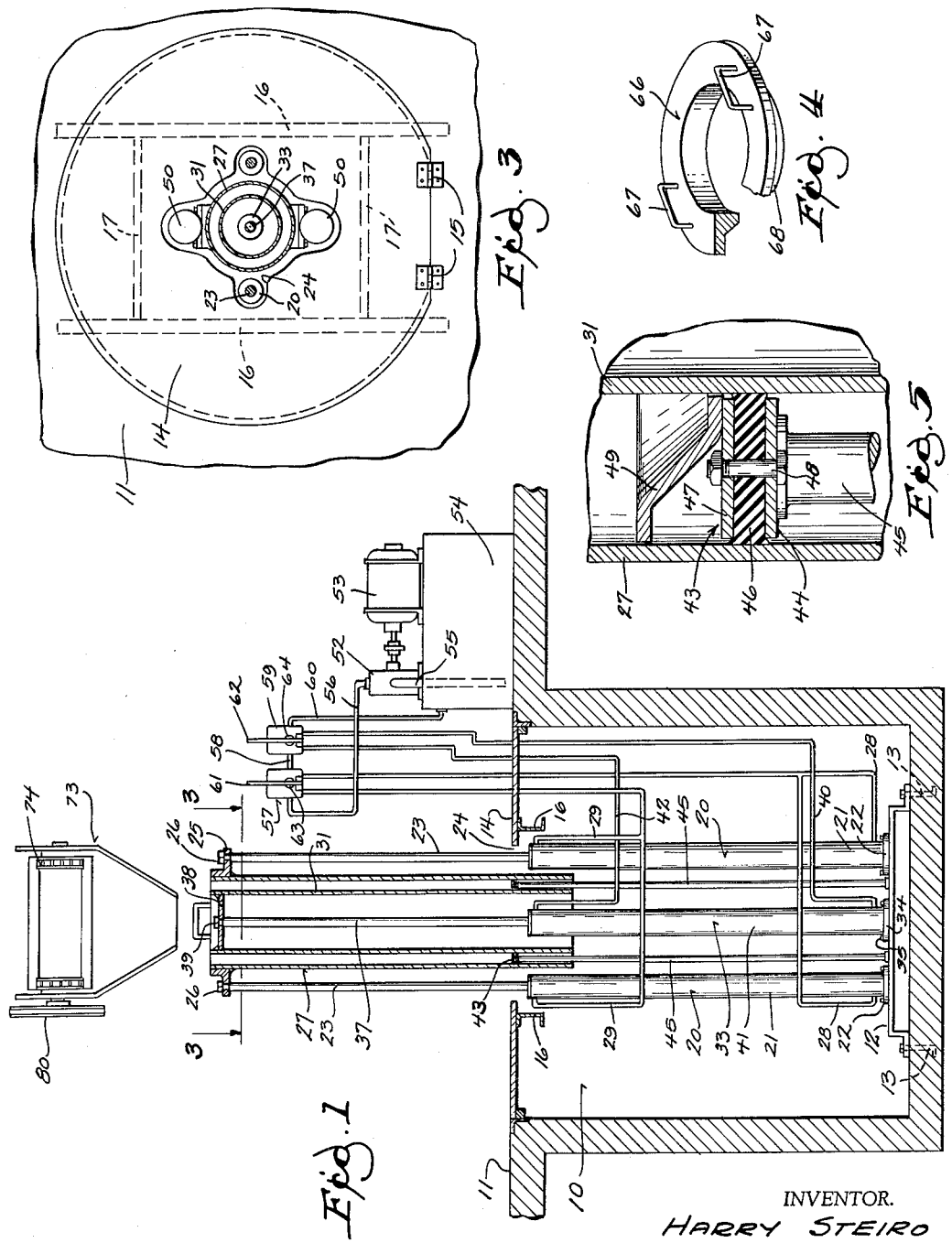
INVENTOR.
HARRY STEIRO
BY
Lieber, Lieber & Nilles
ATTORNEYS

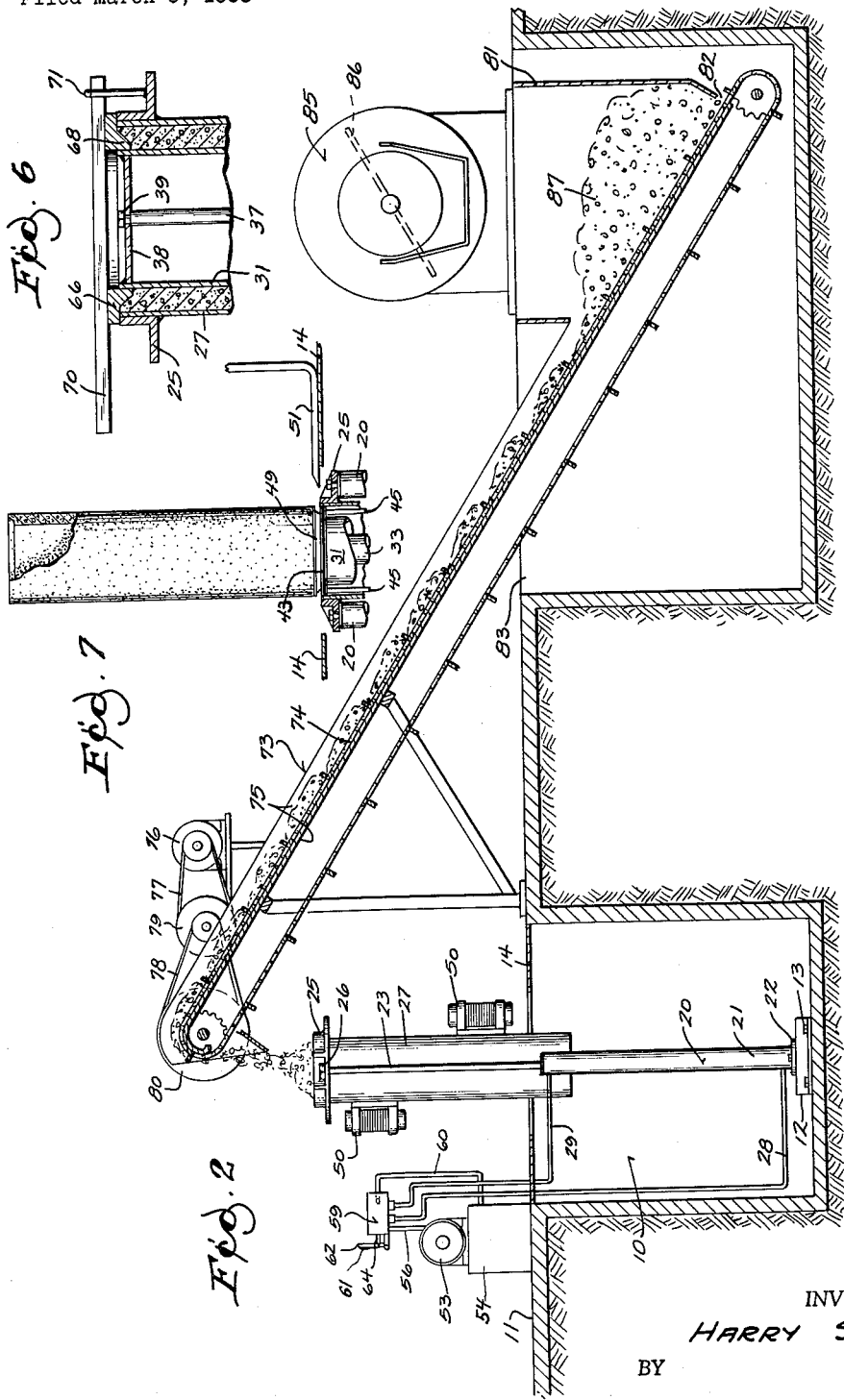

United States Patent Office 3,047,929
Patented Aug. 7, 1962

3,047,929
CONCRETE PIPE MAKING APPARATUS
Harry Steiro, Madison, Wis., assignor to Steiro Engineering Co., Inc., Madison, Wis., a corporation of Wisconsin
Filed Mar. 5, 1958, Ser. No. 719,253
3 Claims. (Cl. 25—30)

This invention relates to concrete pipe making machines of the type which utilize a no-slump mix and in which the inner and outer molds are each of one piece construction and are removed from the finished pipe by axial movement relative thereto. Vibrators are used in machines of this general type to settle the mix in the molds and the present invention finds particular utility when used for making larger sizes of pipe.

In the art of making pipes which are comparatively long and/or are large in diameter, certain problems have arisen. For example, in making a pipe which is five feet in length and of twelve inch internal diameter, mechanical means should be provided for loading the mix into the mold if any degree of efficiency is to be attained. This mechanical feeding device should be stationary and not require moving for every loading operation of the pipe molds. In addition, the finished product, which is of considerable size and weight should not require lifting or excessive handling in removing it from the machine to its curing area.

Definite advantages result from the manufacture of pipe by means of axially strippable one-piece molds having vibrators attached thereto. For example, a drier mix can be used which results in a stronger product and one which requires no delay in removing or assembling the mold therefor. More accurate control of wall thickness is also possible and only a minimum amount of molds and other equipment are necessary for good production rates.

In my co-pending U.S. application, Serial Number 678,894, filed August 19, 1957, now U.S. Patent No. 2,926,411, issued March 1, 1960, a machine is provided in which the inner and outer molds are axially stripped from the finished product in opposite directions and this machine is used with considerable success in the manufacture of tiles and smaller sizes of pipes. However, in the manufacture of larger pipes, for example of five foot length, such a machine would require a total vertical operating space of over fifteen feet. In addition to this impractical height, it would be difficult if not impossible to load such a machine, particularly if a stationary feed device is to be employed and excessive drop of the mix to be avoided.

According to the present invention, a concrete pipe making machine is provided which utilizes inner and outer molds each of one piece construction, which molds are both stripped axially downwardly, preferably the inner core being withdrawn first. The invention contemplates that the molds be withdrawn below the level of the floor so that the finished product need be lifted only a few inches, by a lift truck for example, in order to convey it away from the manufacturing station. The invention furthermore provides a mix feeding device which can be set up permanetly, if desired, with its discharge end immediately over the molds and connected with a mix making apparatus. The arrangement is such that only a minimum height is required for the stripping operation and the molds may be readily filled from a fixed feed level.

The invention provides a machine of the above type which is highly flexible as to the size range of products produced thereby. In other words, various lengths of pipes may be made simply by changing the extent to which the molds are raised preparatory to the filling operation.

The invention generally provides a machine for making concrete pipes, particularly of the larger sizes, which is efficient in operation and produces a product of exceptional strength and density, uniform wall thickness and at a good production rate which results in a cost less than pipes produced by conventional means.

It is also an object of this invention to provide an improved method of making concrete pipe in molds which are located at the floor level and then withdrawing both an inner and outer mold downwardly below the floor level so as to completely expose the finished pipe which is supported at the floor level, the arrangement being such that the finished product can be easily removed without appreciable lifting in either direction and without the necessity of having any appreciable overhead clearance area.

These and other objects and advantages of the invention will appear hereinafter as this disclosure progresses, reference being had to the accompanying drawings, in which:

FIGURE 1 is a front elevational view, in section, of a machine made in accordance with the present invention, certain parts broken away or removed for the sake of clarity;

FIGURE 2 is a side elevational view of the machine shown in FIGURE 1;

FIGURE 3 is a fragmentary plan view of the machine shown in FIGURE 2, the view being taken on line 3—3 of FIGURE 1;

FIGURE 4 is a perspective view of a tamping ring used with the machine for forming the top edge of the pipe;

FIGURE 5 is a fragmentary sectional view on an enlarged scale of the pipe support ring and seal between the molds;

FIGURE 6 is a fragmentary sectional view, on an enlarged scale, of the top of the machine and showing the tamping ring in place; and FIGURE 7 is an elevational view of a finished pipe, parts being broken and in section for clarity, and showing the molds in their lowermost position.

Referring in greater detail to the drawings, a pit 10 is formed below the floor level 11 at the bottom of which is located the support stand 12 which in turn is anchored in place by bolt means 13. A floor plate 14 is hinged at 15 and is held in place by the channel iron frame members 16 and 17 secured across the top of the pit.

Pressure fluid actuated devices in the form of a pair of large double acting hydraulic cylinder assemblies 20 are vertically positioned in the pit 10 and each include a cylinder 21 having a flange 22 at its lower end by which they are bolted to the stand 12. The assemblies also include the piston rods 23 which are adapted to extend through an opening 24 in the hinged floor plate 14. The upper ends of the piston rods receive a frame ring 25 which is held captive thereon by the nuts 26 threaded on the ends of the rods. The outer mold 27 consists of a cylindrical steel tube which has an internal diameter equal to the external diameter desired for the finished product. The upper end of the outer mold is secured in the ring 25 and is vertically positioned by the fluid pressure assemblies 20. Fluid conduits 28 are in communication with the lower end of cylinders 21 and conduits 29 are in communication with the rod end of these cylinders.

The inner mold or core 31 is of round tubular steel construction and is generally co-extensive in length with the outer mold and concentric therewith. A centrally located large hydraulic cylinder assembly 33 is secured through its lower end flange 34 by bolts 35 to stand 12. The piston rod 37 of the pressure fluid assembly 33 is connected at its upper end to the plate 38 by nut 39. Plate 38 is secured, as by welding, in upper end of core mold 31 to thereby close it. Admission of pressure fluid via conduit 40 to the lower end of cylinder 41 will raise the inner core and pressure fluid entering the upper end of the cylinder via conduit 42 will cause the core 31 to be lowered.

The arrangement is such, as will appear later, that the molds may be vertically positioned independently of one another or, alternatively, may be moved together.

A pipe support ring assembly 43 (FIGS. 1, 5, and 7) is located between the molds and is held fixed at floor level by the vertical supports 45 secured to stand 12. A flexible seal 46, such as a rubber gasket is located between ring 44 and a similar ring 47. Rings 44 and 47 are secured together by bolt means 48 and when the latter are tightened the rubber seal is squeezed against the molds to form a sliding seal therewith. By this means mix is prevented from escaping below the molds and accumulating in the pit.

A tongue forming ring 49 is set on top of the support ring assembly 43 and the mix is poured directly thereon, thus forming a tongue on the end of the pipe. The ring 49 acts also as a loading pallet, the tines of a loading fork 51 (FIG. 7) being inserted under the ring for transporting the finished pipe away after the molds have been lowered beneath the floor. After the pipe has cured the ring 49 is removed.

Vibrating means are provided for settling the relatively dry mix in between the molds. This means includes a pair of vibrators 50, which are secured to opposite sides of the outer mold and on opposite ends thereof. These vibrators are of the electric motor type having adjustable eccentric weights on its shaft. Rotation of the eccentric weights produces vibrations which are transmitted directly to the entire mold assembly. The type of vibrator which has proved to be highly successful for use with no-slump mix is of relatively low frequency and high amplitude, for example, a frequency of 3000 impulses per minute and up to 4000 pounds of amplitude or impact. The result is to actually place no-slump concrete in the molds, and not merely segregate water and air from concrete slush. The vibrations are conducted uniformly around the pipe forms, both on the outside and inside. A high compressive, homogeneous wall and tongue structure is thereby provided having a low absorption characteristic.

Pressure fluid for actuating the hydraulic cylinder assemblies 20 and 33 is provided by the conventional fluid pump 52 driven by the electric motor 53 and sucks oil from the sump 54 through conduit 55. The pump discharges pressure fluid through conduit 56 into the outer mold control valve unit 57 and then through conduit 58 into the inner mold control valve unit 59. A return conduit 60 returns fluid to the sump. The control valves are conventional and are of the open center, spool type. The levers 61, 62 are pivotally mounted on their respective valve units 57 and 59 and serve to move the spools 63, 64 of their units 57, 59, respectively, to actuate their cylinder assemblies, as follows.

Referring to FIGURE 2, movement of lever 61 and its spool to the left will cause fluid pressure to be delivered to the lower end of cylinders 21 via conduits 28 and will permit fluid to be returned to the sump from the other end of the cylinders 21 via conduits 29, thus raising the outer mold 27. Movement of lever 61 to the right, as viewed in FIGURE 2, will reverse the flow of fluid in conduits 28 and 29 to lower the outer mold 27.

Movement of lever 62 and its spool to the left or right (FIG. 2) will cause pressure fluid to be directed to the lower or upper end, respectively of cylinder 41, and the return of fluid from the opposite end, to raise or lower the inner core 31.

The rising movement of the molds may be stopped at any point during their travel by allowing their levers to return to the neutral position. By this means any length of pipe can be easily made, it being necessary to simply raise the molds above the ring 49 to the length of pipe desired. Alternatively, for a large run of any one length of pipe, piston rods of suitable length may be selected accordingly so as to allow full travel of the rods and eliminate the necessity of the operator stopping the mold travel at the selected point for each pipe to be made.

A tamping ring 66 (FIG. 4) having handles 67 and a bell-forming annular projection 68 is placed on top of the molds after they have been filled to tamp and form the upper end of the pipe. The projection 68 extends between the molds and rests on top of the mix. A lever 70 (FIG. 6) is inserted at one end under the U-shaped bracket 71 and is adapted to lie across the top of ring 66 when the latter is in place. The operator then pushes down on the free end of the lever to thereby cause the ring to compact the upper few inches of the mix between the molds and form it into a bell-mouth shape.

A stationary feed means 73 is provided which has its discharge end positioned directly over the upper ends of the molds when the latter are in the raised position. This means includes an endless belt type conveyor 74 which is driven over its frame 75 by the electric motor 76, flexible drive belts 77, 78, idler pulley 79 and driven pulley 80.

The upper flight of the endless raddle type conveyor carries mix from the bin 81 located below the floor level. Bin 81 has an open bottom 82 extending in alignment with the conveyor through which mix drops onto the conveyor. The conveyor extends through an opening 83 in the floor.

A mixing container 85 is provided above the bin 81 at floor level and contains the rotatable mixing screw 86. After it has been properly agitated, the concrete mix 87 is permitted to drop into the bin 81 for deposit on the conveyor.

The mixing and conveying means is necessarily very large and heavy and cannot be readily moved about once it is set in position. With the present invention, a large quantity of mix is always available and the discharge end of the conveyor may remain stationary and located closely adjacent the upper end of the molds so as to provide for minimum drop by gravity into the forms.

To start a cycle of operation, the operator would stand in front of the machine, or to the left as viewed in FIGURE 2, and, assuming the molds were empty, would pull both control levers 61, 62 toward him with one hand, thus lowering both molds to expose support ring 47. He would then place the forming ring or pallet 49 on ring 47 and move levers 61, 62 simultaneously in the other direction to thereby cause both molds to raise at the same time.

The electric motor 76 would then be started to cause conveyor 73 to deliver mix to the molds and the vibrators also turned on. The entire mold assembly is thoroughly vibrated while the forms are filling and the operator guides or deflects the mix between the molds. When the molds are filled sufficiently, the conveyor and vibrators are turned off and the tamping ring is inserted on the mix and lever 70 inserted in bracket 71 and pulled downwardly to compact and form the top edge of the pipe.

The lever 70 and tamping ring are then removed and the operator pushes the lever 62 to thereby lower the inner mold and retract it from the pipe. The lever 61 is then pushed to cause the outer mold to be lowered and expose the pallet ring 49. A lift truck (not shown) having a fork tine is then used to lift the ring and pipe only slightly for transport to a curing area.

Various modes of carrying out the invention are contemplated as being within the scope of the following claims particularly pointing out and distinctly claiming the subject matter which is regarded as the invention.

I claim:

1. A machine for making concrete pipe and operable from a floor, a pit formed in said floor and having a bottom a distance beneath said floor, said machine comprising, a vertically positioned outer tubular mold, an inner mold adapted to fit within said outer mold to form an annular chamber therebetween into which concrete mix may be poured from the top end thereof, vibrator means mounted on one of said molds, an elevationally fixed support ring between said molds and located adjacent the level of said floor for supporting a finished pipe, said ring having vertical supports extending upwardly from the pit bottom, and pressure fluid means for axially shifting both of said molds over said ring and between a raised pipe forming position above said floor and a lower position in said pit below said floor, said pressure fluid means being mounted on said pit bottom, whereby when said molds are both located in said pit said fixed ring and the finished pipe supported thereon are exposed at floor level.

2. In combination, a machine for making concrete pipe at the fixed level of a floor, a stationary overhead mix feed apparatus, said floor having a pit formed therein and located directly beneath said feed apparatus, said machine being vertically positionable so as to form a concrete pipe standing at said floor level and then said machine being retractable below said floor level and into said pit to thereby completely expose the finished pipe at floor level, said machine comprising, a vertically positioned outer tubular mold, an inner mold adapted to fit within said outer mold to form an annular chamber therebetween into which concrete mix may be poured from said feed apparatus, a fixed support ring between said molds and located adjacent the level of said floor for supporting a finished pipe, vertical supports for said ring and mounted on the pit bottom, and pressure fluid means mounted on the pit bottom for axially shifting both of said molds over said ring and between a raised pipe forming position above said floor and a lower position below said floor in which latter position said molds expose said fixed ring and the finished pipe supported thereon.

3. A method of making a concrete pipe at the level of a floor comprising, vertically shifting concentric inner and outer molds upwardly to the level of said floor and around the fixed support ring, pouring a no-slump concrete mix into the space formed between said concentric molds, vibrating said mix to form a compact pipe on said ring, immediately thereafter stripping both of said molds downwardly beneath said floor level to thereby completely expose said pipe, and then immediately removing said pipe.

References Cited in the file of this patent

UNITED STATES PATENTS

| | | |
|---|---|---|
| 985,888 | Fair | Mar. 7, 1911 |
| 1,140,785 | Williams | May 25, 1915 |
| 1,399,325 | Straub | Dec. 6, 1921 |
| 2,356,852 | Hutchinson | Aug. 29, 1944 |
| 2,712,679 | Everhart et al. | July 12, 1955 |
| 2,717,435 | Livingston et al. | Sept. 13, 1955 |
| 2,839,278 | Rowe | June 17, 1958 |

FOREIGN PATENTS

| | | |
|---|---|---|
| 1,116,341 | France | Jan. 30, 1956 |
| 355,793 | Great Britain | Aug. 24, 1931 |
| 128,815 | Sweden | Apr. 26, 1949 |